United States Patent
Yoshitomi et al.

(10) Patent No.: US 10,169,669 B2
(45) Date of Patent: Jan. 1, 2019

(54) DRIVING ASSISTANCE APPARATUS AND DRIVING ASSISTANCE METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Naoto Yoshitomi, Kariya (JP); Jian Hu, Kariya (JP); Shota Satomura, Kariya (JP); Yusuke Fujimaki, Nisshin (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 143 days.

(21) Appl. No.: 15/166,712

(22) Filed: May 27, 2016

(65) Prior Publication Data

US 2016/0350606 A1  Dec. 1, 2016

(30) Foreign Application Priority Data

May 29, 2015  (JP) ................................. 2015-110571

(51) Int. Cl.
*G06K 9/00* (2006.01)
*B60Q 9/00* (2006.01)
*G08G 1/0962* (2006.01)
*G08G 1/0967* (2006.01)

(52) U.S. Cl.
CPC .......... *G06K 9/00818* (2013.01); *B60Q 9/00* (2013.01); *G06K 9/00798* (2013.01); *G08G 1/09623* (2013.01); *G08G 1/096716* (2013.01); *G08G 1/096783* (2013.01)

(58) Field of Classification Search
CPC .................................................. G06K 9/00818
See application file for complete search history.

(56) References Cited

U.S. PATENT DOCUMENTS

2007/0177014 A1  8/2007  Frenzel et al.
2009/0195411 A1  8/2009  Ichihashi et al.
(Continued)

FOREIGN PATENT DOCUMENTS

DE  102004042382  3/2006
JP  2002-163643  6/2002
JP  2009-187166  8/2009

*Primary Examiner* — James M Pontius
(74) *Attorney, Agent, or Firm* — Knobbe, Martens, Olson & Bear LLP

(57) ABSTRACT

A driving assistance apparatus includes a sign recognizing unit, a notification executing unit, and a lane change determining unit. The sign recognizing unit recognizes a traffic sign from an image captured by an on-board imaging apparatus. The notification executing unit notifies a driver of information indicated by the traffic sign recognized by the sign recognizing unit. The lane change determining unit determines whether or not an own vehicle is making a lane change. If the lane change determining unit determines that the own vehicle is making a lane change while traveling on a road in which different traffic signs are provided among traffic lanes, the notification executing unit notifies the driver of destination lane information that is information for a traffic lane to which the own vehicle is moving.

7 Claims, 7 Drawing Sheets

(56) References Cited

U.S. PATENT DOCUMENTS

2013/0101174 A1* 4/2013 Meis ................ G08G 1/096716
                                                                    382/104
2015/0213319 A1 7/2015 Frenzel et al.
2015/0215550 A1 7/2015 Frenzel et al.

* cited by examiner

DRIVING ASSISTANCE APPARATUS AND DRIVING ASSISTANCE METHOD

CROSS-REFERENCE TO RELATED APPLICATION

This application is based on and claims the benefit of priority from Japanese Patent Application No. 2015-110571, filed May 29, 2015. The entire disclosure of the above application is incorporated herein by reference.

BACKGROUND

Technical Field

The present disclosure relates to a driving assistance apparatus and a driving assistance method. In particular, the present disclosure relates a technique for assisting in driving of a vehicle.

Related Art

Conventionally, a technique is known in which a traffic sign is recognized from an image of a vehicle periphery captured by an on-board camera. Information indicated by the recognized traffic sign is displayed on a monitor inside a vehicle cabin (for example, refer to Japanese Patent Publication No. 4604088). A driver is able to recognize information on regulations pertaining to a road on which the driver is traveling, guidance information, and the like by visually recognizing the information displayed on the monitor.

Depending on the country and region, there are roads, such as expressways, in which the speed limit differs for each traffic lane. However, in the above technique, described in Japanese Patent Publication No. 4604088, no consideration is given to cases in which a vehicle is traveling on a road in which the speed limit differs for each traffic lane. Therefore, the same speed value may continue to be displayed on the monitor, regardless of the traffic lane in which the vehicle is traveling. In this case, the driver is provided with an erroneous speed value. There is concern that the driver will not be provided with accurate driving assistance.

SUMMARY

It is thus desired to provide a driving assistance apparatus that is capable of accurately notifying a driver of information indicated by a traffic sign.

The present disclosure uses the following means to solve the above-described problem.

An exemplary embodiment of the present disclosure provides a driving assistance apparatus that assists in driving of a vehicle. The driving assistance apparatus includes: a sign recognizing unit that recognizes a traffic sign from an image captured by an on-board imaging apparatus; a notification executing unit that notifies a driver of information indicated by the traffic sign recognized by the sign recognizing unit; and a change determining unit that determines whether or not an own vehicle is making a lane change. The notification executing unit notifies the driver of destination lane information (or moving destination information) that is information for a traffic lane to which the own vehicle is moving (or changing), when the change determining unit determines that the own vehicle is making a lane change while the own vehicle is traveling on a road in which different traffic signs are provided among traffic lanes.

According to the above-described configuration, when the own vehicle makes a lane change while traveling on a road in which different traffic signs are provided among traffic lanes, the driver is provided with information that applies to the traffic lane to which the own vehicle is moving. Therefore, the driver can be accurately provided with information on restrictions and the like for the traffic lane in which the own vehicle is traveling. As a result, the driver can be provided with accurate assistance in safe driving.

DESCRIPTION OF THE EMBODIMENTS

An embodiment implementing a driving assistance apparatus will hereinafter be described with reference to the drawings. The driving assistance apparatus is an on-board apparatus that performs driving assistance of a vehicle based on an image of an area ahead of the vehicle. The image is captured by an imaging apparatus that is mounted in the vehicle. First, an overall configuration of a driving assistance system according to the present embodiment will be described with reference to FIG. 1.

Figure 1:
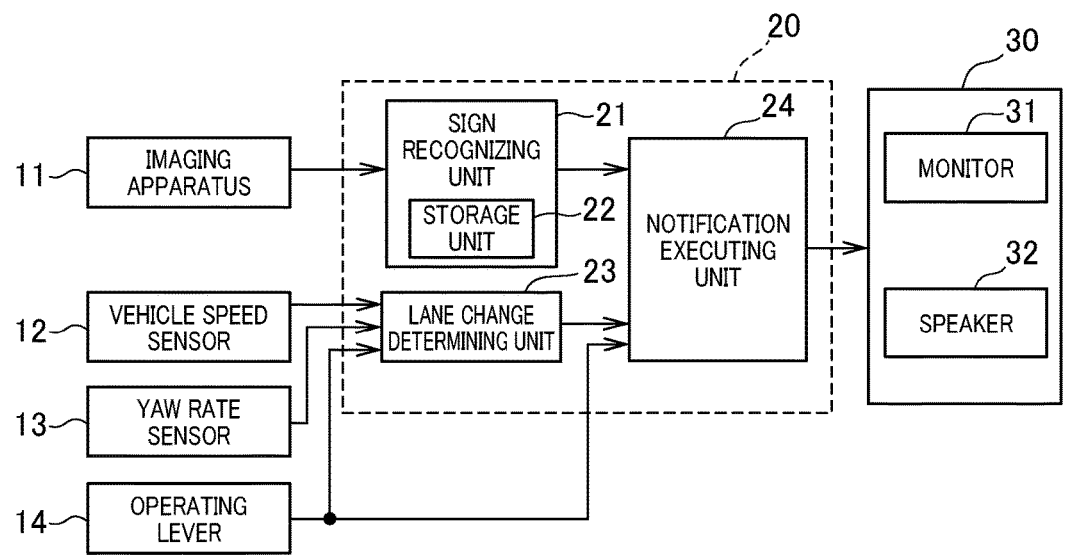
FIG. 1 is a block diagram of an overall configuration of a driving assistance system according to an embodiment.

In FIG. 1, an imaging apparatus 11 is an on-board camera. The imaging apparatus 11 is configured by at least one of a charge-coupled device (CCD) camera, a complementary metal-oxide semiconductor (CMOS) image sensor, a near-infrared camera, and the like. The imaging apparatus 11 is arranged near the upper side of a front windshield of the vehicle, for example. The imaging apparatus 11 captures a surrounding environment including a road ahead of the own vehicle.

A driving assistance apparatus 20 is a computer that includes a central processing unit (CPU), a read-only memory (ROM), a random access memory (RAM), an input/output (I/O), and the like. The driving assistance apparatus 20 includes a sign recognizing unit 21, a lane change determining unit 23, and a notification executing unit 24. The driving assistance apparatus 20 runs a program stored in a non-transitory, tangible storage medium. The various functions are actualized by the driving assistance apparatus 20 running the program.

The sign recognizing unit 21 acquires an image captured by the imaging apparatus 11. The sign recognizing unit 21 recognizes a traffic sign included in the acquired image by pattern matching. In pattern matching, the sign recognizing unit 21 uses patterns for traffic signs that are prepared in advance, for example. The method for recognizing a traffic sign included in an image is not limited thereto. For example, a method in which recognition is performed through use of a linear classifier may also be used. The sign recognizing unit 21 recognizes a number that is displayed on the traffic sign from features in the recognized traffic sign. The sign recognizing unit 21 stores the recognized number on the traffic sign in a storage unit 22. The storage unit 22 is configured by a rewritable, non-volatile memory.

The lane change determining unit 23 receives input of detection signals from various sensors provided in the vehicle. The lane change determining unit 23 also receives input of operating signals of various equipment operated by the driver. The lane change determining unit 23 determines whether or not the own vehicle is making a lane change based on these input signals. The various sensors include a vehicle speed sensor 12 that detects the speed of the own vehicle, a yaw rate sensor 13 that detects an angular velocity (yaw rate) in a turning direction of the vehicle, and the like.

The vehicle is also provided with a turn indicator (not shown). The turn indicator includes an operating lever 14 that serves as a left-right turn operating unit. The driver operates the operating lever 14 to input the direction in which the vehicle will turn, that is, a left turn or a right turn. The operating lever 14 is operated by the driver to be set to any of a left indication position, a neutral position, and a right indication position. A turn signal, serving as an operating signal, is outputted to the lane change determining unit 23 and the notification executing unit 24 based on the position to which the operating lever 14 is operated.

The notification executing unit 24 receives input of information indicated by the traffic sign that is recognized by the sign recognizing unit 21. The notification executing unit 24 then notifies the driver of the inputted information. As an example, when a traffic sign displaying a speed limit is recognized, the notification executing unit 24 notifies the driver of a numerical value indicating the speed limit displayed on the sign. The notification executing unit 24 performs notification through a notifying unit 30.

The notifying unit 30 includes a monitor 31 that displays an image, a speaker 32 that outputs a warning sound and audio guidance, and the like. According to the present embodiment, the monitor 31 is set in a position inside the vehicle cabin that is visible to the driver. The monitor 31 displays the numerical value indicating the speed limit. The monitor 31 thereby provides the driver with speed limit information for the road on which the own vehicle is currently traveling, and prompts caution.

Here, depending on the country and region, there are roads composed of a plurality of traffic lanes in which the speed limit differs for each traffic lane. On a road such as this, when a numerical value displayed on a speed limit sign captured by the imaging apparatus 11 is displayed on the monitor 31 without taking into consideration the traffic lane in which the own vehicle is traveling, the driver may be provided with an erroneous speed value.

Therefore, when the own vehicle is traveling on a road provided with traffic signs that differ among a plurality of traffic lanes, the notification executing unit 24 notifies the driver of information indicated by the traffic sign for the traffic lane in which the own vehicle is traveling, among the traffic signs recognized by the sign recognizing unit 21. When the lane change determining unit 23 determines that the own vehicle is making a lane change, the notification executing unit 24 performs a process for notifying the driver of destination lane information (or moving destination information) that is for the traffic lane to which the own vehicle is moving (or changing).

FIGS. 2A to 2D show a transition in the display on the monitor 31 when an own vehicle 50 makes a lane change while traveling on a road in which a different speed limit is set for each traffic lane. In FIGS. 2A to 2D, a situation is presumed in which the own vehicle 50 is traveling on a six-lane road 60 that includes a first traffic lane 61, a second traffic lane 62, and a third traffic lane 63. The own vehicle 50 is entering a zone in which a different speed limit is set for each traffic lane, from a zone in which no speed limit is set. Here, respective speed limit signs 64a to 64c for the traffic lanes are provided on a sign pole 64. The numerical value indicating the speed limit of the first traffic lane 61 is "70". The numerical value indicating the speed limit of the second traffic lane 62 is "50". The numerical value indicating the speed limit of the third traffic lane 63 is "90".

Figures 2A, 2B, 2C, 2D:
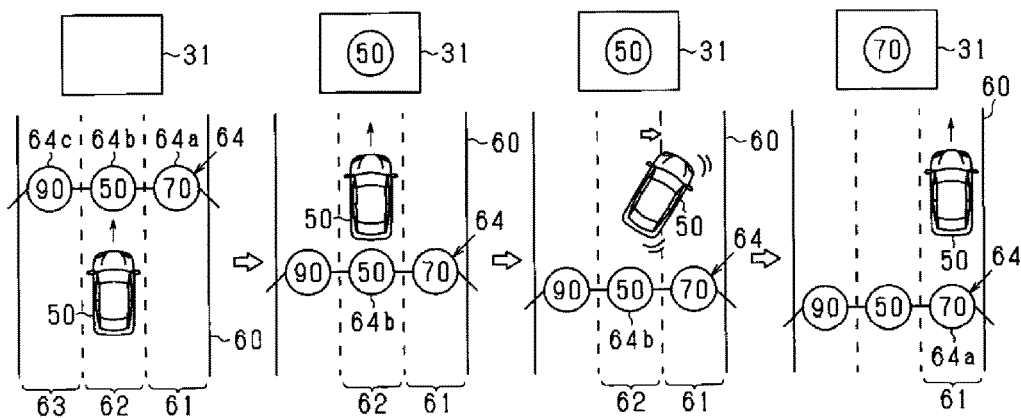
FIGS. 2A to 2D are diagrams of a specific aspect when a traffic sign for a traffic lane to which a vehicle is moving is recognized, according to the embodiment.

In FIGS. 2A to 2D, a value indicating the speed limit is not displayed on the monitor 31 while the own vehicle 50 is traveling in the zone in which no speed limit is set (see FIG. 2A). From this state, the own vehicle 50 enters the zone in which the different speed limit signs 64a to 64c are provided for the respective traffic lanes. When the speed limit signs 64a to 64c are recognized from an image captured by the imaging apparatus 11, a numerical value indicated by a recognized speed limit sign is displayed on the monitor 31 as the destination lane information. Here, the numerical value indicated by the speed limit sign 64b, among the speed limit signs 64a to 64c, for the travel lane of the own vehicle is displayed on the monitor 31 (see FIG. 2B).

A situation is considered in which, after the numerical values of all of the respective speed limit signs 64a to 64c for the first traffic lane 61 to the third traffic lane 63 are recognized based on the image, the own vehicle changes lanes from the second traffic lane 62 to the first traffic lane 61. In this case, in accompaniment with the lane change by the own vehicle 50, the display on the monitor 31 switches from the numerical value "50" indicated by the speed limit sign 64b for the travel lane before the lane change to the numerical value "70" indicated by the speed limit sign 64a for the travel lane to which the lane change is made (see FIG. 2C and FIG. 2D). As a result, the driver is provided with information related to the speed limit sign for the own traffic lane after the lane change.

Here, in the zone in which the respective speed limit signs 64a to 64c are set for the traffic lanes, not all of the signs may be captured by the imaging apparatus 11. In addition, the numerical value indicated by the speed limit sign may not be identified during image processing. Taking such issues into consideration, when the traffic sign for the traffic lane to which the own vehicle 50 is moving cannot be recognized, the notification executing unit 24 notifies the driver of information indicated by the traffic sign in a position closest to the own vehicle 50, among the traffic signs recognized by the sign recognizing unit 21, as the destination lane information.

Figures 3A, 3B, 3C, 3D:
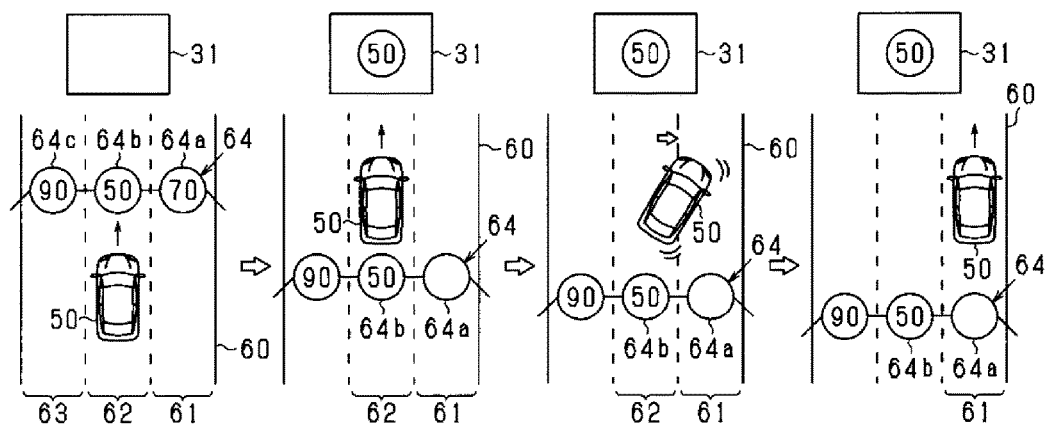
FIGS. 3A to 3D are diagrams of a specific aspect when a traffic sign for a traffic lane to which a vehicle is moving is not recognized, according to the embodiment.

FIGS. 3A to 3D show a transition in the display on the monitor 31 when the information indicated by the traffic sign for the traffic lane to which the own vehicle 50 is moving cannot be recognized. The scene in which the own vehicle 50 is traveling is the same as that in FIGS. 2A to 2D. In FIGS. 3A to 3D, upon entry of the own vehicle 50 into the zone in which a different speed limit sign is set for each traffic lane, the speed limit signs 64b and 64c for the second traffic lane 62 and the third traffic lane 63 are recognized. However, the speed limit sign 64a for the first traffic lane 61 is not recognized. In FIGS. 3B to 3D, the numerical value on the sign is not indicated for the speed limit sign that is not recognized by the imaging apparatus 11. When the own vehicle 50 is traveling in the second traffic lane 62, among the first traffic lane 61 to the third traffic lane 63, the numerical value "50" indicated on the speed limit sign 64*b* for the second traffic lane 62 is displayed on the monitor 31 (see FIG. 3B).

When the own vehicle 50 changes lanes from the second traffic lane 62 to the first traffic lane 61 after passing the sign pole 64, information indicated by the traffic sign in the position closest to the own vehicle 50, among the speed limit signs recognized from the image, is displayed on the monitor 31, as the destination lane information. Here, the numerical value "50" indicated on the speed limit sign 64*b* for the second traffic lane 62 is displayed on the monitor 31 (see FIGS. 3C and 3D). As a result, information presumed to have the strongest connection with the speed limit for the own traffic lane after the lane change, among the pieces of speed limit information recognized from the image, is provided to the driver as the destination lane information.

Figure 4:
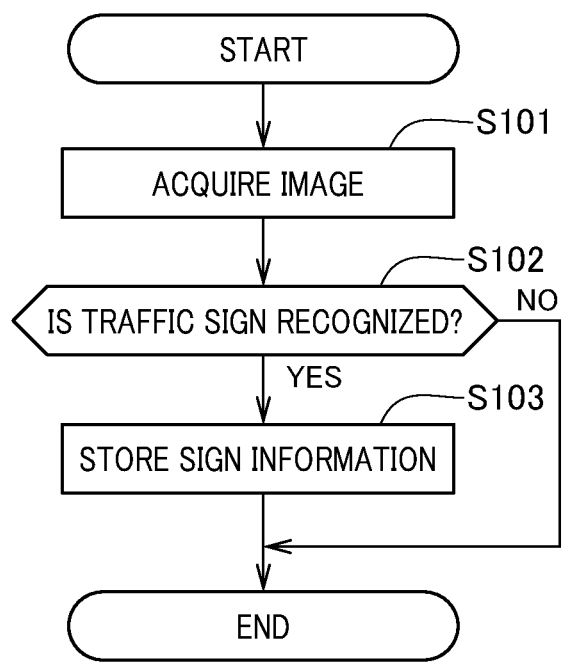
FIG. 4 is a flowchart of a processing procedure for a sign recognizing process according to the embodiment.

Next, driving assistance control according to the present embodiment will be described with reference to the flowcharts in FIGS. 4 to 6. Each process in FIGS. 4 to 6, described below, may be actualized by an electronic circuit, which is hardware. Alternatively, at least a portion may be actualized by software, that is, by a process performed on a microcomputer.

First, a sign recognizing process performed by the sign recognizing unit 21 will be described with reference to FIG. 4. This process is performed at a predetermined cycle. In FIG. 4, at step S101, the sign recognizing unit 21 acquires an image from the imaging apparatus 11 and performs recognition of a traffic sign included in the acquired image. At subsequent step S102, the sign recognizing unit 21 determines whether or not a traffic sign is recognized. When determined that a traffic sign is recognized, the sign recognizing unit 21 proceeds to step S103. The sign recognizing unit 21 stores sign information in the storage unit 22. The sign information is information indicated on the traffic sign. At this time, in a zone in which a different speed limit sign is set for each of a plurality of traffic lanes, the sign information is stored such that the information indicated on the recognized traffic sign is associated with the position of the traffic lane.

Next, a notification executing process performed by the notification executing unit 24 will be described with reference to FIG. 5. This process is performed at a predetermined cycle by the notification executing unit 24.

Figure 5:
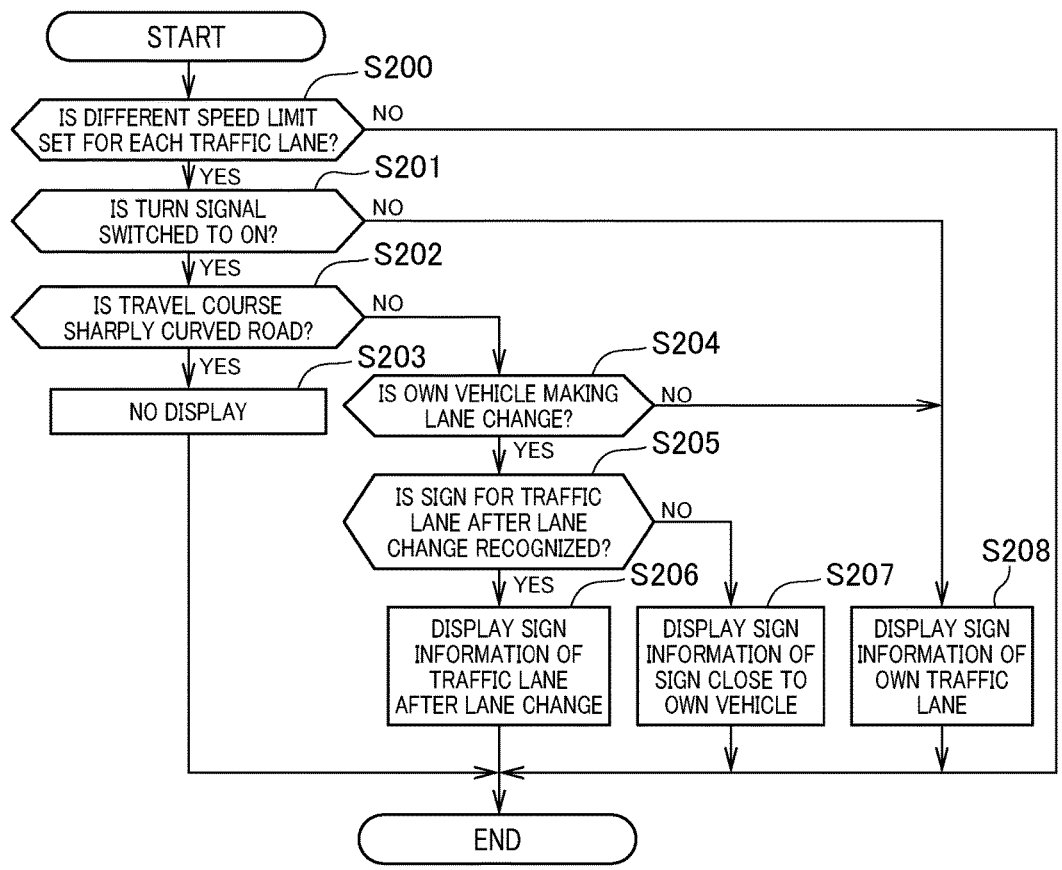
FIG. 5 is a flowchart of a processing procedure for a notification executing process according to the embodiment.

In FIG. 5, at step S200, the notification executing unit 24 determines whether or not the own vehicle 50 is traveling in a zone in which a different speed limit sign is set for each traffic lane. Here, the notification executing unit 24 determines whether or not the own vehicle 50 is traveling in a zone in which a different speed limit sign is set for each traffic lane based on an image acquired from the imaging apparatus 11. Alternatively, the notification executing unit 24 may determine whether or not the own vehicle 50 is traveling in a zone in which a different speed limit sign is set for each traffic lane based on information acquired by an on-board navigation apparatus (not shown).

At subsequent step S201, the notification executing unit 24 determines whether or not the turn signal inputted from the operating lever 14 is switched to on. That is, the notification executing unit 24 determines whether or not the operating lever 14 is operated so as to be switched to the left indication position or the right indication position from the neutral position. When determined that the turn signal is switched to on, the notification executing unit 24 proceeds to step S202. The notification executing unit 24 determines whether or not a travel course on which the own vehicle 50 is traveling is a road (hereafter, a sharply curved road) of which the curvature is greater than a predetermined curve determination value. Here, the notification executing unit 24 calculates an estimate R that is a curve radius of the travel course, as the curvature of the travel course of the own vehicle 50. The notification executing unit 24 then determines that the road is a sharply curved road when the calculated estimate R is less than a first determination value Rth1. The estimate R is calculated from the yaw rate detected by the yaw rate sensor 13 and the vehicle speed determined by the vehicle speed sensor 12.

The method for calculating the estimate R is not limited to the foregoing. For example, the image acquired by the imaging apparatus 11 may be used. Alternatively, the estimate R may be calculated from a steering angle detected by a steering angle sensor (not shown) and the vehicle speed detected by the vehicle speed sensor 12.

When determined that the travel course of the own vehicle 50 is a sharply curved road, the notification executing unit 24 proceeds to step S203 and stops notification of the sign information. That is, when the driver is being notified of the sign information, the notification executing unit 24 stops the notification and does not notify the driver of the destination lane information. According to the present embodiment, the monitor 31 is in a non-displaying state.

When determined that the travel course of the own vehicle 50 is not a sharply curved road, the notification executing unit 24 proceeds to step S204. The notification executing unit 24 determines whether or not the own vehicle 50 is making a lane change. Here, the notification executing unit 24 receives input of a determination result of a lane change determining process from the lane change determining unit 23. The notification executing unit 24 then determines whether or not the own vehicle 50 is making a lane change based on the received result. When determined that the own vehicle 50 is not making a lane change, the notification executing unit 24 proceeds to step S208. The notification executing unit 24 displays the sign information for the traffic lane in which the own vehicle 50 is currently traveling.

When determined that the own vehicle 50 is making a lane change, the notification executing unit 24 proceeds to step S205. The notification executing unit 24 determines whether or not the traffic sign for the traffic lane to which the own vehicle 50 is moving is recognized. Specifically, the notification executing unit 24 determines whether or not sign information corresponding to the traffic lane to which the own vehicle 50 is moving is stored in the storage unit 22 of the sign recognizing unit 21.

When determined that the traffic sign for the traffic lane to which the own vehicle 50 is moving is recognized, the notification executing unit 24 proceeds to step S206. The notification executing unit 24 notifies the driver of the sign information for the traffic lane to which the own vehicle 50 is moving, as the destination lane information. Specifically, the notification executing unit 24 displays the numerical value indicated on the speed limit sign for the traffic lane to which the own vehicle 50 is moving on the monitor 31.

Meanwhile, when determined that the traffic sign for the traffic lane to which the own vehicle 50 is moving is not recognized, the notification executing unit 24 proceeds to step S207. The notification executing unit 24 notifies the driver of the information indicated on the traffic sign present in the position closest to the own vehicle 50, among the traffic signs recognized by the sign recognizing unit 21, as the destination lane information. Here, among the pieces of sign information related to the speed limit stored in the storage unit 22, the numerical value indicated on the speed limit sign present in the position closest to the own vehicle 50 is displayed on the monitor 31.

Next, the lane change determining process performed by the lane change determining unit 23 will be described with reference to FIG. 6. This process is performed at a predetermined cycle by the lane change determining unit 23. According to the present embodiment, determination conditions regarding lane change differ depending on the curvature of the travel course of the own vehicle 50.

Figure 6:
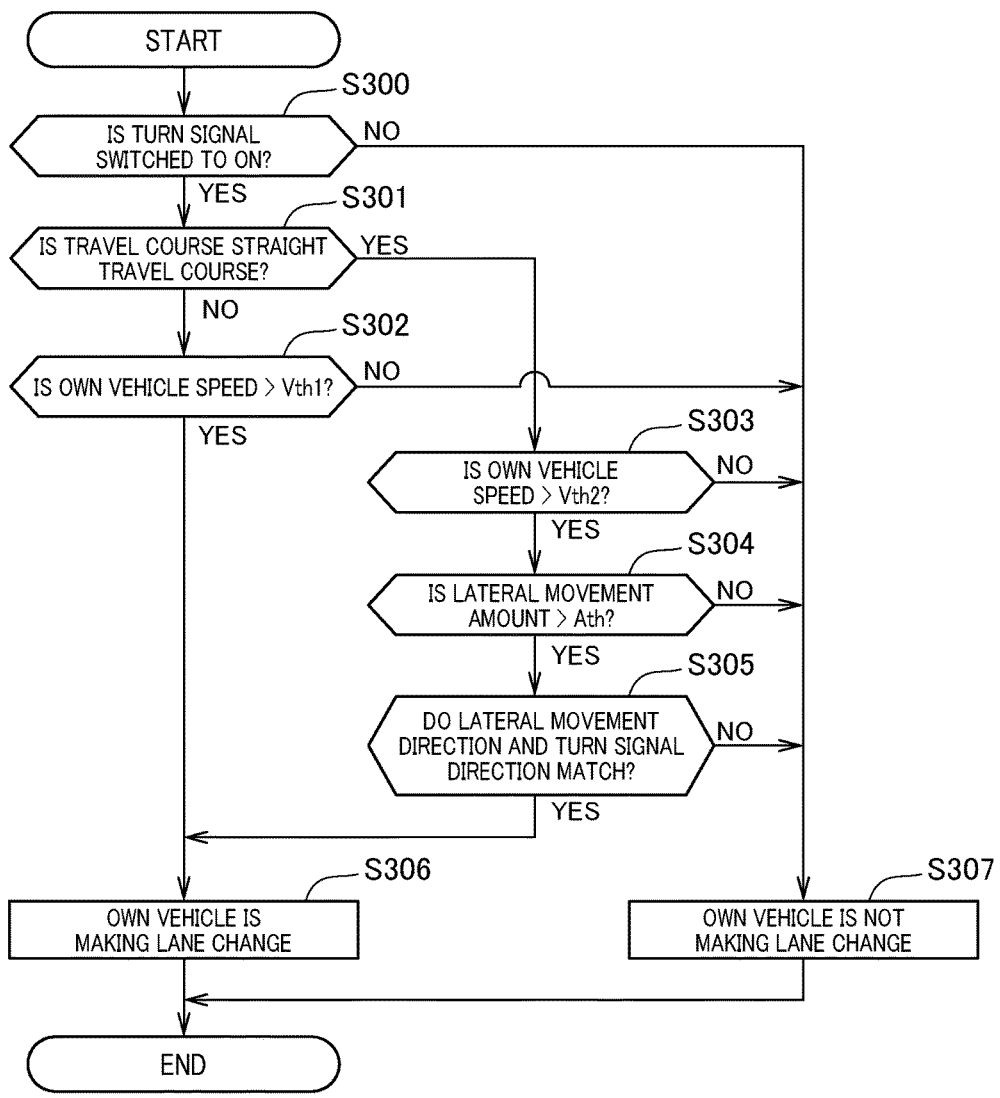
FIG. 6 is a flowchart of a processing procedure for a lane change determining process according to the embodiment.

In FIG. 6, at step S300, the lane change determining unit 23 determines whether or not the turn signal inputted from the operating lever 14 is switched to on. When determined that the turn signal is switched to on, the lane change determining unit 23 proceeds to step S301.

At step S301, the lane change determining unit 23 determines whether or not the travel course of the own vehicle 50 is a road (hereafter, a straight travel course) of which the curvature is less than a predetermined straight road determination value. Here, the lane change determining unit 23 determines whether or not the estimate R of the travel course is greater than a second determination value Rth2. The straight road determination value is a value at which the curvature becomes less than that at the curve determination value. The second determination value Rth2 is a value at which the estimate R becomes greater than that at the first determination value Rth1.

When determined that the travel course of the own vehicle 50 is not a straight travel course, the lane change determining unit 23 proceeds to step S302. The lane change determining unit 23 determines whether or not the vehicle speed detected by the vehicle speed sensor 12 is higher than a first determination speed Vth1 (such as 30 to 40 km/h). When determined that the vehicle speed is the first determination speed Vth1 or lower, the lane change determining unit 23 proceeds to step S307 and determines that the own vehicle 50 is not making a lane change. Meanwhile, when determined that the vehicle speed is higher than the first determination speed Vth1, the lane change determining unit 23 proceeds to step S306 and determines that the own vehicle 50 is making a lane change.

Conversely, when determined that the own vehicle 50 is traveling on a straight travel course based on the estimate R, at steps S303 to S305, the lane change determining unit 23 determines whether or not the own vehicle 50 is making a lane change based on detection results of the vehicle speed of the own vehicle 50 and a lateral movement by the own vehicle 50. That is, at step S303, the lane change determining unit 23 determines whether or not the vehicle speed detected by the vehicle speed sensor 12 is higher than a second determination speed Vth2 (such as 30 to 40 km/h). According to the present embodiment, the first determination value Vth1 and the second determination value Vth2 are set to the same value. However, the first determination value Vth1 and the second determination value Vth2 may be set to differing values.

When determined that the vehicle speed is higher than the second determination speed Vth2, the lane change determining unit 23 proceeds to step S304. The lane change determining unit 23 determines whether or not a lateral movement amount of the own vehicle 50 is greater than a predetermined amount. Here, the lane change determining unit 23 calculates the lateral movement amount of the own vehicle 50 after the turn signal is switched to on, based on images acquired from the imaging apparatus 11. The lane change determining unit 23 then compares the calculated lateral movement amount with a determination amount Ath prescribed based on vehicle width.

When determined that the lateral movement amount is greater than the determination value Ath, the lane change determining unit 23 proceeds to step S305. The lane change determining unit 23 determines whether or not a turn signal direction inputted from the operating lever 14 matches a lateral movement direction of the own vehicle 50. When determined that the turn signal direction and the lateral movement direction match, the lane change determining unit 23 proceeds to step S306 and determines that the own vehicle 50 is making a lane change. The processes at steps S304 and S305 correspond to a process for detecting a lateral movement made by the own vehicle 50. Meanwhile, when determined NO at any of steps S303 to S305, the lane change determining unit 23 proceeds to step S307 and determines that the own vehicle 50 is not making a lane change.

The timing at which the lane change determining unit 23 determines that the own vehicle 50 is making a lane change based on the lateral movement amount can be set as appropriate, based on the determination value Ath. Specifically, the lane change determining unit 23 may determine that the own vehicle 50 is making a lane change at a timing at which only a portion of the own vehicle 50 has entered an adjacent traffic lane, that is, in a state in which the own vehicle 50 is straddling a white line. Alternatively, the lane change determining unit 23 may determine that the own vehicle 50 is making a lane change at a timing after the entire own vehicle 50 has entered an adjacent traffic lane.

Figure 7:
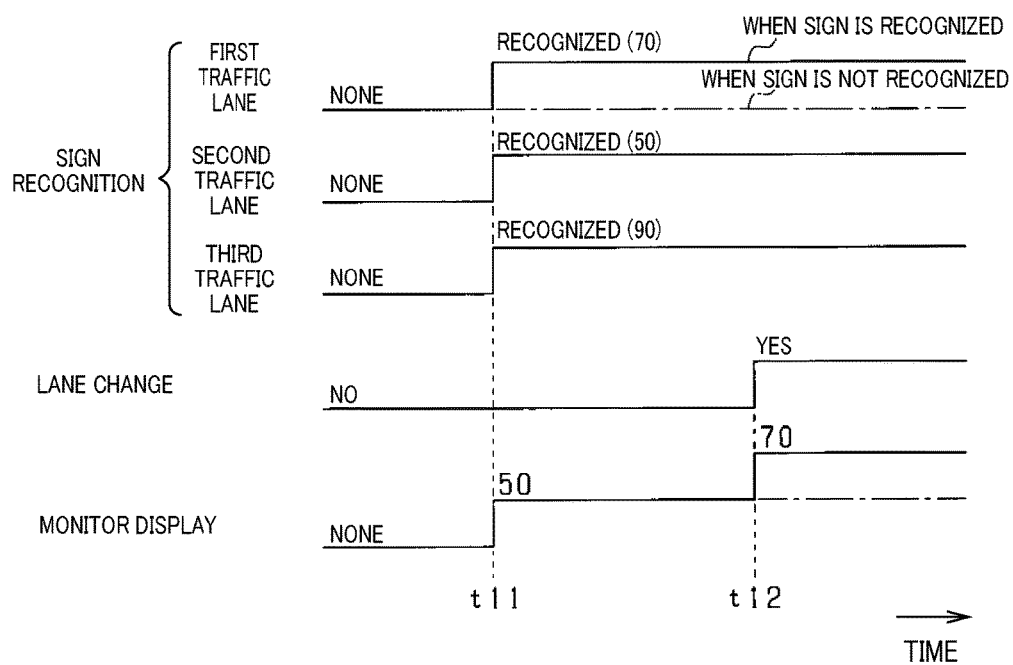
FIG. 7 is a time chart of a transition in monitor display during lane change according to the embodiment.

Next, a transition in the monitor display will be described with reference to the time chart in FIG. 7. The scene in which the own vehicle 50 is traveling is the same as that in FIG. 2. In FIG. 7, when a speed limit sign is recognized from an image, the value indicated on the recognized speed limit sign is stored in association with the traffic lane as the sign information (time t11). In addition, among the stored pieces of sign information, the sign information of the own traffic lane is displayed on the monitor 31. Thereafter, when the own vehicle 50 starts to make a lane change and the lane change is determined to be made, the destination lane information is displayed on the monitor 31 (time t12). At this time, when the sign information of the traffic lane to which the own vehicle 50 is moving is recognized from the image, the information is displayed on the monitor 31, as indicated by the solid line. Conversely, when the sign information is not recognized, information indicated on the speed limit sign in the position closest to the own vehicle 50 is displayed on the monitor 31, as indicated by the single-dot chain line.

According to the present embodiment described in detail above, the following excellent effects are achieved.

When the own vehicle 50 makes a lane change while traveling on a road in which the applicable traffic signs differ among traffic lanes, the driver is provided with information for the traffic lane to which the own vehicle 50 is moving. As a result of this configuration, the driver can be accurately provided with information on restrictions and the like for the traffic lane in which the own vehicle 50 is traveling. As a result, the driver can be provided with accurate assistance in safe driving.

When determined that the own vehicle 50 is making a lane change and the traffic sign for the traffic lane to which the own vehicle 50 is moving is recognized, the driver is notified of the information indicated by the traffic sign for the traffic lane to which the own vehicle 50 is moving, as the destination lane information. As a result of this configuration, notification of traffic restriction information is made based on images actually captured by the imaging apparatus 11. Therefore, the driver can be provided with accurate information.

When determined that the own vehicle 50 is making a lane change but a traffic sign for the traffic lane to which the own vehicle 50 is moving is not recognized, the driver is notified of information indicated by the traffic sign in the position closest to the own vehicle 50, among the traffic signs recognized by the sign recognizing unit 21 and stored in the storage unit 22, as the destination lane information. As a result of this configuration, when a traffic sign for the traffic lane to which the own vehicle 50 is moving is not recognized, the driver can be provided with information that is reliable as information for the traffic lane to which the own vehicle 50 is moving, among the pieces of information acquired by the imaging apparatus 11.

When traveling on a straight road, the driver most likely thinks that they are being provided, by the system, with accurate information corresponding to the current travel scene. With focus on this idea, when the curvature of the travel course of the own vehicle 50 is less than a predetermined straight road determination value, whether or not the own vehicle is making a lane change is determined based on stricter conditions, compared to when the curvature is the straight road determination value or greater.

Specifically, when the own vehicle 50 is traveling on a straight road, the own vehicle 50 is determined to be making a lane change if predetermined conditions including the following two conditions are met: (1) operating lever 14 of the turn indicator is operated to the left indication position or the right indication position; and (2) a lateral movement of the own vehicle 50 is detected. When the own vehicle 50 is traveling on a curved road, the own vehicle 50 is determined to be making a lane change if predetermined condition including the following condition is met: (3) operating lever 14 of the turn indicator is operated to the left indication position or the right indication position, regardless of the detection result of the lateral movement of the own vehicle 50. As a result of this configuration, whether or not the own vehicle 50 is making a lane change can be more accurately determined when the own vehicle 50 is traveling on a straight road. As a result, the driver can be more accurately provided with information corresponding to the current travel scene.

In addition, when the own vehicle 50 is traveling on a curved road, the lateral movement amount of the own vehicle 50 may be offset by the lateral movement attributed to the curved road, when the own vehicle 50 is making a lane change in the direction opposite the direction of the curve in the road. Taking this issue into consideration, whether or not the own vehicle 50 is making a lane change is determined based on conditions that do not include the detection result of the lateral movement of the own vehicle 50, when the own vehicle 50 is traveling on a road of which the curvature is greater than the straight road determination value. As a result, an erroneous determination that the own vehicle 50 is making a lane change when the own vehicle 50 is not actually making a lane change, can be suppressed.

When the own vehicle 50 is traveling on a sharply curved road, the lateral movement attributed to the curve in the road significantly affects the determination regarding lateral movement accompanying lane change. In addition, vehicle speed decreases. Accurate differentiation between a change in course accompanying a left or right turn or a lane merger, and a lane change may be difficult. In light of this issue, the driver is not notified of the destination lane information when the own vehicle 50 is traveling on a road of which the curvature is greater than a predetermined curve determination value. As a result, a situation in which the driver is provided with erroneous information can be prevented to the greatest extent possible.

(Other Embodiments)

The present disclosure is not limited to the above-described embodiment. For example, the present disclosure may be carried out as follows. Hereafter, sections according to the embodiments that are the same or equivalent are given the same reference numbers. Descriptions of sections having the same reference numbers are omitted.

According to the above-described embodiment, the conditions for determining a lane change differ depending on the curvature of the travel course of the own vehicle 50. However, whether or not the own vehicle 50 is making a lane change may be determined based on the same determination conditions, regardless of the curvature of the travel course. Specifically, the own vehicle 50 is uniformly determined to be making a lane change, regardless of the curvature of the travel course, when two conditions are met. The two conditions are that the turn signal is switched to on and the vehicle speed is higher than the first determination speed Vth1. Alternatively, the own vehicle 50 may be uniformly determined to be making a lane change, regardless of the curvature of the travel course, when three conditions are met. The three conditions include the own vehicle 50 making a lateral movement, in addition to the two conditions above.

According to the above-described embodiment, the lateral movement of the own vehicle 50 is detected based on the lateral movement amount and the lateral movement direction of the own vehicle 50. However, the method for detecting the lateral movement is not limited thereto. For example, the lateral movement of the own vehicle 50 may be detected based on a lateral movement speed and the lateral movement direction of the own vehicle 50. Alternatively, the lateral movement of the own vehicle 50 may be detected by an amount by which the own vehicle 50 is straddling a white line being detected from an image captured by the imaging apparatus 11, and the amount by which the own vehicle 50 is straddling the white line being compared with a determination value. Furthermore, the lateral movement may be detected based on the steering angle of the own vehicle 50. Specifically, the own vehicle 50 is determined to be making a lateral movement when the steering angle detected by a steering angle sensor is greater than a predetermined steering angle.

According to the above-described embodiment, when a lane change by the own vehicle 50 is detected and a traffic sign for the traffic lane to which the own vehicle 50 is moving is not recognized, the driver is notified of the information indicated by the traffic sign present in the position closest to the own vehicle 50, among the road signs recognized by the sign recognizing unit 21, as the destination lane information. This configuration may be modified. Instead of the destination lane information, the driver may be continuously notified of the information indicated by the traffic sign for the traffic lane before the lane change, as is. Alternatively, the notification of sign information to the driver may be stopped.

In a state in which the lane change by the own vehicle 50 is detected and a traffic sign for the traffic lane to which the own vehicle 50 is moving is not recognized, when a plurality of traffic signs at the same distance from the own vehicle 50 are present, the sign information containing the strictest restriction, among the plurality of traffic signs, may be displayed. For example, when two speed limit signs at the same distance from the own vehicle 50 are recognized, the lower value of the two speed limits is displayed on the monitor 31.

According to the above-described embodiment, an example is given in which the information indicated by the traffic sign recognized by the sign recognizing unit 21 is displayed on the monitor 31. However, the information may be outputted as sound from the speaker 32. In addition, the traffic sign for which notification is given as the destination lane information is not limited to the speed limit sign. Traffic signs that differ among traffic lanes are applicable.

The above-described constituent elements are conceptual and are not limited to the above-described embodiment. For example, functions provided by a single constituent element may be actualized such as to be dispersed among a plurality of constituent elements. Functions provided by a plurality of constituent elements may be actualized by a single constituent element.

What is claimed is:

1. A driving assistance apparatus that assists in driving of an own vehicle, the driving assistance apparatus comprising:
    a sign recognizer, using a processor, that recognizes a traffic sign from an image captured by an on-board imaging apparatus;
    a notification executer, using the processor, that notifies a driver of information indicated by the traffic sign recognized by the sign recognizer; and
    a change determiner, using the processor, that determines whether or not the own vehicle is making a lane change, wherein
    the notification executer notifies the driver of destination lane information that is information for a traffic lane to which the own vehicle is moving, if the change determiner determines that the own vehicle is making a lane change while the own vehicle is traveling on a road in which different traffic signs are provided among traffic lanes;
    the notification executer notifies the driver of, as the destination lane information, information indicated by a traffic sign for the traffic lane to which the own vehicle is moving, if the change determiner determines that the own vehicle is making a lane change and the sign recognizer recognizes the traffic sign for the traffic lane to which the own vehicle is moving; and
    the notification executer notifies the driver of, as the destination lane information, information indicated by a traffic sign in a position closest to the own vehicle, among traffic signs recognized by the sign recognizer, if the change determiner determines that the own vehicle is making a lane change and the sign recognizer does not recognize a traffic sign for the traffic lane to which the own vehicle is moving.

2. The driving assistance apparatus according to claim 1, wherein:
    the own vehicle is provided with a turn indicator including a left-right turn operating unit that is operated by the driver to input a direction in which the own vehicle makes a left turn or a right turn;
    if a curvature of a travel course of the own vehicle is determined to be less than a predetermined straight road determination value, the change determiner determines that the own vehicle is making a lane change based on predetermined conditions including
        (i) a first condition that the left-right turn operating unit is operated for input and
        (ii) a second condition that a lateral movement of the own vehicle is detected; and
    if a curvature of a travel course of the own vehicle is determined to be greater than the predetermined straight road determination value, the change determiner determines that the own vehicle is making a lane change based on predetermined conditions including
        (iii) a third condition that the left-right turn operating unit being operated for input, regardless of a detection result for lateral movement.

3. The driving assistance apparatus according to claim 2, wherein:
    the notification executer does not notify the driver of the destination lane information, if the curvature of the travel course of the own vehicle is determined to be greater than a predetermined curve determination value.

4. A driving assistance apparatus that assists in driving of an own vehicle, the driving assistance apparatus comprising:
    a sign recognizer, using a processor, that recognizes a traffic sign from an image captured by an on-board imaging apparatus;
    a notification executer, using the processor, that notifies a driver of information indicated by the traffic sign recognized by the sign recognizer; and
    a change determiner, using the processor, that determines whether or not the own vehicle is making a lane change, wherein:
    the notification executer notifies the driver of destination lane information that is information for a traffic lane to which the own vehicle is moving, if the change determiner determines that the own vehicle is making a lane change while the own vehicle is traveling on a road in which different traffic signs are provided among traffic lanes; and
    the notification executer notifies the driver of, as the destination lane information, information indicated by a traffic sign in a position closest to the own vehicle, among traffic signs recognized by the sign recognizer, if the change determiner determines that the own vehicle is making a lane change and the sign recognizer does not recognize a traffic sign for the traffic lane to which the own vehicle is moving.

5. A driving assistance apparatus that assists in driving of an own vehicle, the driving assistance apparatus comprising:
    a sign recognizer, using a processor, that recognizes a traffic sign from an image captured by an on-board imaging apparatus;
    a notification executer, using the processor, that notifies a driver of information indicated by the traffic sign recognized by the sign recognizer; and
    a change determiner, using the processor, that determines whether or not the own vehicle is making a lane change, wherein:
    the notification executer notifies the driver of destination lane information that is information for a traffic lane to which the own vehicle is moving, if the change determiner determines that the own vehicle is making a lane change while the own vehicle is traveling on a road in which different traffic signs are provided among traffic lanes;
    the own vehicle is provided with a turn indicator including a left-right turn operating unit that is operated by the driver to input a direction in which the own vehicle makes a left turn or a right turn;
    if a curvature of a travel course of the own vehicle is determined to be less than a predetermined straight road determination value, the change determiner determines that the own vehicle is making a lane change based on predetermined conditions including
 (i) a first condition that the left-right turn operating unit is operated for input and
 (ii) a second condition that a lateral movement of the own vehicle is detected; and
if a curvature of a travel course of the own vehicle is determined to be greater than the predetermined straight road determination value, the change determiner determines that the own vehicle is making a lane change based on predetermined conditions including
 (iii) a third condition that the left-right turn operating unit being operated for input, regardless of a detection result for lateral movement.

6. A driving assistance apparatus that assists in driving of an own vehicle, the driving assistance apparatus comprising:
 a sign recognizer, using a processor, that recognizes a traffic sign from an image captured by an on-board imaging apparatus;
 a notification executer, using the processor, that notifies a driver of information indicated by the traffic sign recognized by the sign recognizer; and
 a change determiner, using the processor, that determines whether or not the own vehicle is making a lane change, wherein:
 the notification executer notifies the driver of destination lane information that is information for a traffic lane to which the own vehicle is moving, if the change determiner determines that the own vehicle is making a lane change while the own vehicle is traveling on a road in which different traffic signs are provided among traffic lanes; and
 the notification executer does not notify the driver of the destination lane information, if a curvature of a travel course of the own vehicle is determined to be greater than a predetermined curve determination value.

7. A driving assistance method that is performed by a driving assistance apparatus that assists in driving of an own vehicle, the driving assistance method comprising:
 recognizing a traffic sign from an image captured by an on-board imaging apparatus;
 notifying a driver of information indicated by the recognized traffic sign;
 determining whether or not the own vehicle is making a lane change;
 at the step of notifying, notifying the driver of destination lane information that is information for a traffic lane to which the own vehicle is moving, if the own vehicle is determined to be making a lane change while traveling on a road in which different traffic signs are provided among traffic lanes;
 at the step of notifying, notifying the driver of, as the destination lane information, information indicated by a traffic sign for the traffic lane to which the own vehicle is moving, if the own vehicle is determined to be making a lane change and if the traffic sign for the traffic lane to which the own vehicle is moving is recognized; and
 at the step of notifying, notifying the driver of, as the destination lane information, information indicated by a traffic sign in a position closest to the own vehicle, among the recognized traffic signs, if the own vehicle is determined to be making a lane change and if the traffic sign for the traffic lane to which the own vehicle is moving is not recognized.

* * * * *